United States Patent Office 3,176,008
Patented Mar. 30, 1965

3,176,008
5-PHENYL-BENZOTRIAZEPIN-2-ONE COMPOUNDS AND THEIR PRODUCTION
Theodore S. Sulkowski, Narberth, and Scott J. Childress, Newtown Square, Pa., assignors to American Home Products Corporation, New York, N.Y., a corporation of Delaware
No Drawing. Filed Sept. 11, 1962, Ser. No. 222,940
7 Claims. (Cl. 260—239.3)

This invention relates to a new class of psychotherapeutic heterocyclic compounds having valuable properties as anticonvulsants. These compounds are substituted 1,3-dihydro-5-aryl-2H-1,3,4-benzotriazepin - 2 - ones and have the general formula:

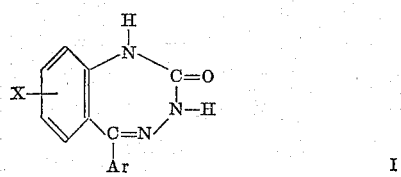

wherein X is hydrogen, halogen, nitro, lower alkyl or substituted lower alkyl, and Ar is an aromatic radical selected from the group consisting of phenyl and monohalophenyl.

In the definition of these compounds, the term "lower alkyl" refers to those alkyl groups having from one to five carbon atoms therein. These alkyl groups may be straight-chained or branched.

The compounds of the invention may be prepared by reacting a 2-amino-benzophenone hydrazone (II) with phosgene in the presence of a tertiary amine, as shown in the following equation:

METHOD I

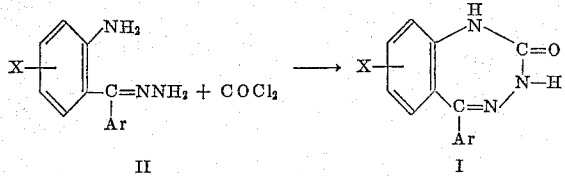

An alternative method for preparing the present compounds consists in heating a 2-amino-benzophenone (III) with a hydrazino acid ester as shown in the following equation:

METHOD II

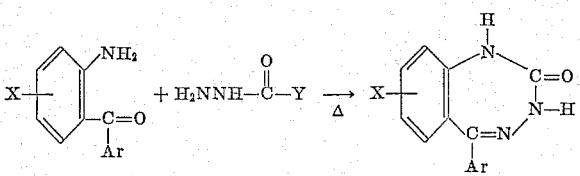

where Y is an alkoxy group.

In preparative Method I, a tertiary amine is employed together with a suitable inert solvent in order to react with the hydrogen chloride liberated in the reaction. Suitable tertiary amines include trimethylamine, triethylamine, tributylamine and dimethylaniline. Suitable inert solvents include chloroform, methylene chloride, benzene and toluene.

For best results in carrying out Method I, it is recommended to slowly add a solution of phosgene to a cooled solution containing the hydrazone and the tertiary amine. Preferably, the reaction temperature during this addition should not exceed about 10° C. After the addition of phosgene is completed, the mixture is stirred at room temperature, filtered and the filtrate is evaporated to dryness in vacuo. The residue is dissolved in hot ethanol and treated with charcoal and the product precipitates on standing.

In Method II, the benzophenone and the hydrazino acid ester reactant are heated under autogenous pressure at a temperature ranging from about 180° to about 225° and preferably at 190° C. The mixture is then cooled to room temperature, diluted with ethanol and filtered. The product precipitates upon standing.

The following Examples illustrate the practice of this invention:

Example 1

A solution of 12 g. of 12.5% phosgene in benzene solution is added dropwise to a cooled solution of 3.2 g. of 2-amino-benzophenone hydrazone and 5 ml. of triethylamine in 50 ml. of benzene. After addition is completed the mixture is stirred at room temperature for one hour, filtered, and the filtrate evaporated to dryness in vacuo. The residue is dissolved in hot ethanol and treated with charcoal. On standing 1,3-dihydro-5-phenyl-2H-1,3,4-benzotriazepin-2-one, M.P. 238–239.5° C., precipitates. Analysis calc'd. for $C_{14}H_{11}N_3O$: C, 70.87; H, 4.68; N, 17.70. Found: C, 70.69; H, 4.53; N, 18.04.

Example 2

A solution of 8 g. of 12.5% phosgene in benzene solution is added dropwise to a cooled solution of 2 g. of 2-amino-5-methylbenzophenone hydrazone and 3 ml. of triethylamine in 50 ml. of benzene. The mixture is stirred an additional hour at room temperature, filtered, and the filtrate evaporated to dryness in vacuo. The residue is dissolved in hot ethanol and treated with charcoal. On standing 7-methyl-1,3-dihydro-5-phenyl-2H-1,3,4-benzotriazepin-2-one, M.P. 253–254.5° C., is obtained. Analysis calc'd. for $C_{15}H_{13}N_3O$: C, 71.70; H, 5.21; N, 16.72. Found: C, 71.61; H, 5.43; N, 16.64.

Example 3

A mixture of 5 g. of 2-amino-5-chlorobenzophenone and 5 ml. of ethyl hydrazine carboxylate is heated at 190° for one hour. The mixture is cooled, diluted with 75 ml. of ethanol and filtered. On standing 7-chloro-1,3-dihydro-5-phenyl-2H-1,3,4-benzotriazepin-2-one, M.P. 246–248° C., precipitates. Analysis calc'd. for $C_{14}H_{10}N_3OCl$: C, 61.89; H, 3.72; N, 15.47. Found: C, 61.65; H, 3.95; N, 15.09.

Example 4

7-trifluoromethyl - 1,3 - dihydro - 5 - phenyl - 2H - 1, 3,4-benzotriazepin-2-one is prepared by heating 5 g. of 2-amino-5-trifluoromethyl benzophenone with 5 ml. of ethyl hydrazine carboxylate as described in Example 3.

Example 5

7-bromo - 1,3 - dihydro - 5 - phenyl-2H-1,3,4-benzotriazepin-2-one is prepared by heating 5 g. of 2-amino-5-bromo benzophenone with 5 ml. ethyl hydrazine carboxylate, as described in Example 3.

Example 6

As described in Example 3, 7-chloro-1,3-dihydro-5-o-chlorophenyl-2H-1,3,4-benzotriazepin-2-one is prepared by heating 5 g. of 2-amino-2'-5-dichloro benzophenone with ethyl hydrazine carboxylate.

Example 7

As described in Example 3, 7-nitro-1,3-dihydro-5-phenyl-2H-1,3,4-benzotriazepin-2-one is prepared by heating 5 g. of 2-amino-5-nitro benzophenone with 5 ml. of ethyl hydrazine carboxylate.

The compounds of this invention may be combined with suitable diluents, solvents, carriers and excipients, as required to provide dosage forms suitable for oral or parenteral administration.

From the teachings of the foregoing examples, it will be obvious to those skilled in the art how to prepare other similar compounds encompassed within the scope of the broader claims.

What is claimed is:

1. A compound having the formula

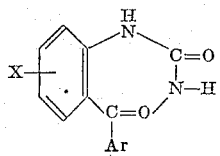

wherein X is selected from the group consisting of hydrogen, nitro, halogen, lower alkyl and trifluoromethyl, and Ar is selected from the group consisting of phenyl and monohalophenyl.

2. 7 - lower alkyl - 1,3 - dihydro - 5 - phenyl - 2H-1,3,4-benzotriazepin-2-one.

3. 7 - monohalo - 1,3 - dihydro - 5 - phenyl - 2H-1,3,4-benzotriazepin-2-one.

4. 1,3 - dihydro - 5 - phenyl - 2H - 1,3,4 - benzotriazepin-2-one.

5. 7 - methyl - 1,3 - dihydro - 5 - phenyl - 2H - 1,3,4-benzotriazepin-2-one.

6. 7 - chloro - 1,3 - dihydro - 5 - phenyl - 2H - 1,3,4-benzotriazepin-2-one.

7. The method which comprises heating together a 2-aminobenzophenone having the formula

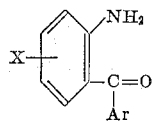

wherein X is selected from the group consisting of hydrogen, nitro, halogen, lower alkyl and trifluoromethyl and Ar is selected from the group consisting of phenyl and monohalophenyl with a hydrazinoacyl compound having the formula:

wherein Y is a lower alkoxy group, to form a compound having the formula:

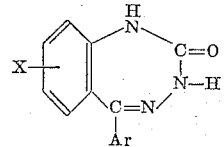

wherein X and Ar are as hereinabove.

References Cited by the Examiner

Busch: Ber. Deut. Chem., vol. 27, pages 2897–2904 (1894).

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,176,008            March 30, 1965

Theodore S. Sulkowski et al.

It is hereby certified that error appears in the above numbered patent requiring correction and that the said Letters Patent should read as corrected below.

Column 3, lines 12 to 18, the formula should appear as shown below instead of as in the patent:

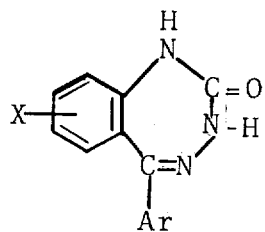

Signed and sealed this 28th day of September 1965.

(SEAL)
Attest:

ERNEST W. SWIDER
Attesting Officer

EDWARD J. BRENNER
Commissioner of Patents